United States Patent Office 3,375,295
Patented Mar. 26, 1968

3,375,295
BODYING POLYMER LIQUID
Richard D. Rowe, Big Spring, Tex., assignor to Cosden Oil & Chemical Company, Big Spring, Tex., a corporation of Delaware
No Drawing. Filed Aug. 31, 1964, Ser. No. 393,353
5 Claims. (Cl. 260—683.15)

ABSTRACT OF THE DISCLOSURE

A low molecular weight polymer fraction, simultaneously produced with heavier liquid polybutene, the total polymeric mixture being normally inert to substantial modification by Friedel-Crafts catalyst, is separated and further treated with Friedel-Crafts catalyst to body the same to a viscous polybutene.

This invention relates to improvement of lower $C_2$–$C_5$ olefine polymer liquids, predominantly of the character of dimer, trimer and tetramer, sometimes with relatively small quantities of higher polymer components, the liquid having an average molecular weight below about 300, by further polymerizing to increase the molecular weight, viscosity and boiling range thereof.

While this method may be applied to improve lower polymer and copolymer liquids, typically dimer, trimer and tetramer, or polymers or copolymers of any lower olefine such as $C_2$ through $C_5$ olefines by any polymerization method, it is preferably applied to increasing the molecular weight and viscosity of $C_4$ lower polymers of the character of dimer, trimer or tetramer obtained as volatile liquid by-product of usual $C_4$ olefine polymerization to produce higher molecular weight liquid polymer.

Various polymerization procedures produce low $C_2$–$C_5$ polymers which can be improved according to this invention, and reference is made to a typical procedure described by Jackson in U.S. Patent No. 2,957,930, dated Oct. 30, 1960. That polymerization is applied to a liquefied $C_1$–$C_5$ refinery gas mixture containing at least 3% of isobutylene, and typically is predominantly composed of $C_4$ hydrocarbons. The polymerization is operated at temperatures above about −45° F. and may be carried out at ambient temperatures; for example, 65° F., using a suspension of solid aluminum chloride particles as the catalyst. That Jackson process also produces by-product volatile polymer liquids which are separated from the heavier more viscous polymer. Such by-product volatile polymer liquids have an average molecular weight below about 300 and which predominantly comprise dimer, trimer and tetramer butylenes, predominantly isobutylene and are usually mixtures thereof which may also contain some higher polymers such as pentamer and hexamer in small quantity, again variable with the reaction conditions. Such volatile lower olefine polymer liquids have been disposed of as cheap hydrocarbon naphtha useful as cheap solvent or fuel because of its substantially very volatile character. That is, it is too volatile for use as normal solvents, lubricants or sealing agents typical of polymerized olefines of higher molecular weight.

According to the present invention lower $C_2$–$C_5$ olefine polymers, typically dimer, trimer and tetramer and mixtures thereof which may also contain minor quantities of higher polymer such as pentamer and hexamer, and typically having a molecular weight below 300 as usually obtained as a by-product in Friedel-Crafts polymerization of lower olefines, are further polymerized by treatment with a Friedel-Crafts catalyst.

It is found, according to this invention, that these lower olefine polymer liquids having an average molecular weight in the range of about 110 to 300 and a correponding low viscosity and volatility may be increased in molecular weight by a Friedel-Crafts type catalyst. Such catalytic treatment may substantially raise the molecular weight of the very low polymers such as dimers, doubling or tripling the molecular weight and the boiling point range thereof while having a lower molecular weight and boiling point increasing effect on the intermediate polymers as the polymer itself already has a higher molecular weight. That is, polymers exceeding an average molecular of about 300 may have only some of its components raised in molecular weight and boiling point while others of higher molecular weight may not be increased, and still higher polymer components may even be depolymerized so that there is little increase in average molecular weight and boiling point of the mixture above the average of 300 M.W. Thus, the molecular weight and boiling point improvement is progressively greater as the average molecular weight of the polymeric by-product liquid is lower. Consequently, following treatment with Friedel-Crafts catalysts according to this invention, the molecular weight and boiling point will be raised and preferred $C_4$ olefines polymer liquid will be increased above about 240 upward to about the 300 molecular weight range area with corresponding effects on boiling point and viscosity or body of the liquid product.

The by-product lower olefine polymer liquids may have their molecular weight and corresponding viscosity increased to a more useful polymer range as stated, by heating the polymer naphtha at a temperature exceeding about 10° F., preferably 30 to 200° F. in the presence of a Friedel-Crafts catalyst such as anhydrous aluminum chloride, boron fluoride, aluminum bromide, aluminum fluoride, boron fluoride-hydrofluoric acid, ferric chloride, stannic chloride and the like, of which I prefer aluminum chloride and boron fluoride. The liquid dimer through tetramer olefine polymer is contacted with about 1 to 10% of the catalyst and stirred for a period of about 15 minutes through 2 hours while maintaining the temperature from about 10 to 200° F. The product is washed free of catalyst and may be then diluted with a solvent and filtered. It is found to have increased in average molecular weight, together with a corresponding increase in viscosity and volatile, very low polymer compounds increase in boiling point range. It is a heavier, more bodied hydrocarbon liquid polymer product having a light amber color and an average molecular weight substantially higher than the initial lower polymer and usually exceeds about 112, and in the case of the preferred $C_4$ polymers would exceed about 240. It may be further purified by various methods; for instance, by hydrogenation such as shown in United States Patent No. 3,100,808 which converts it to a water-white stable liquid.

In typical operation according to this invention, liquid $C_2$–$C_5$ lower olefine polymer is formed according to known procedures using Friedel-Crafts and sometimes Natta and Ziegler-type catalysts, and the volatile polymers boiling above about 100° F. and up to an end point ranging from about 450 to 650° F. are separated, usually by distillation, and used as a starting material for further polymerizing bodying treatment according to the present method. The residual normal heavy oily polymer fraction is processed as usual and then may be used independently; or, if desired, may be combined with the treated naphtha, after bodying, according to the present method. The separated light polymer of molecular weight below about 300 having the composition and characteristics described above, is then treated with a Friedel-Crafts catalyst, preferably at raised temperatures, as described, to body it, increasing the molecular weight in varied degree depending upon the amenability of the liquid to further polymerization by the present treatment.

In preferred procedure, isobutylene monomer is treated as described in the Jackson patent by passing a $C_1$–$C_5$ liquified refinery gas mixture, containing at least 3% of isobutylene monomer, to a reaction column together with fine particles of solid aluminum chloride promoted by traces of water or hydrochloric acid. The catalyst suspension in the liquified gas is passed through a vertical reaction column at a rate sufficient to maintain the catalyst in suspension while the temperature is controlled in the range of −40 to +60° F., whatever temperature is selected in close temperature control, since the temperature largely determines the average molecular weight and viscosity of the initially produced bodied polymer product.

However, it is also possible to operate batchwise using 1 to 10% of catalyst and such method will also be a source of low molecular weight liquids useful for further treatment according to the present method.

The catalyst composition in a continuous polymerization procedure may start out low, as little as 1% to 5%, but by continuous recycle the concentration gradually builds up to about 10% and sometimes higher, the rate of movement of the reaction product through the vertical reactor being adjusted so that heavy spent catalyst sludge may separate out. Consequently, fresh catalyst is supplied with the raw material usually in quantity sufficient to replace the spent catalyst withdrawn from the system. The portion of the reaction mixture withdrawn for product recovery is first allowed to settle to separate most of the catalyst, and the supernatant liquid reaction product is then filtered.

The volatile $C_1$–$C_5$ liquified gaseous solvent is first removed by volatilization and the product is then further distilled, i.e. stripped in one or several stripping stages to remove volatile naphtha components boiling below 625° F. That volatile naphtha component comprising dimers through tetramers with a molecular weight below about 300 is then treated according to the present invention. The liquid naphtha has added thereto Freidel-Crafts catalyst, preferably aluminum chloride, and the suspension is agitated at the raised temperatures up to about 200° F. for a sufficient period of time, at least fifteen minutes, to increase the viscosity and body the naphtha.

It is surprising, as shown in examples below, that the viscosity boiling point and average molecular weight of the bodied liquid by this treatment usually increases and sometimes even doubles, improving the product to a liquid of substantial body useful as the liquid polymer produced in the polymer treatment. It is not known whether this treatment with the Friedel-Crafts catalyst is a continuation of the initial polymerization, or whether it is a mere coupling of lower polymeric molecules. It is not intended that this invention be limited to theory as to the exact reaction which takes place. However, the result of treatment of the polymeric light liquid lower olefine polymer with Friedel-Crafts catalyst in this second stage is in substantial contrast to any similar treatment of a heavy polymer formed in the first stage, since such similar treatment, as shown in examples below, applied to heavy polymer of molecular weight above about 400 either reduces the viscosity and average molecular weight, or else has little or no effect thereon.

The improved bodied liquid polymer of increased viscosity and molecular weight may be used as such for any usual liquid lower olefine polymer use. It may also be blended with other liquid polymers such as the polymer produced in the first stage polymerization, with or without intermediate purification. That is, the lower olefine polymer hereof, after increasing its body, may be purified and then blended with other heavy polymeric liquids or used alone with or without substantial purification for usual bodied liquid polymer use. Alternatively, it may be first blended with other polymeric liquids and the ultimate blend purified to any desired extent.

While the light polymer liquids described are obtained as by-products which are mixtures of dimer, trimer and tetramer with some higher polymer components and as described may be treated as such, that liquid by-product may be fractionated as shown in the examples or otherwise separated in individual hydrocarbon entities such as dimer or trimer, or tetramer, etc., and these may be separately treated with catalyst to further polymerize each as described. The products of increased molecular weight, viscosity and boiling point are useful as such, for instance, as a polymerized dimer fraction, or as a polymerized trimer fraction or as a polymerized tetramer fraction, or each of said separately polymerized fractions may be reblended with any one or all of the others, or any one or all may be reblended with the original heavy polymerized liquid for useful modification thereof. In each case it will be appreciated that a substantially waste light polymer by-product is converted by further polymerization to a useful polymeric bodied end product liquid which was not possible in the original polymerization.

The specific effects of the present method for the treatment per se are illustrated in the following examples.

Example I 500 ml. of the light polymer charge, as further identified in Table 1 below, were added to a large glass beaker at a temperature of about 75° F. 10 grams of $AlCl_3$ were added to the liquid with stirring. The mixture was cooled with continued agitation to 40° F. and allowed to react. The temperature rose to 80° F. where it was maintained by the use of Dry Ice. An additional 10 grams of $AlCl_3$ were added and the temperature kept below 120° F. A yellow plastic like mass of polymer and $AlCl_3$ tended to form on the bottom of the beaker. This was kept dispersed by increased agitation. After 35 minutes from the initial charge, no temperature control was maintained and the temperature rose to 130° F. At this temperature, at about 40 minutes after start, a red complex formed in the mixture and HCl gas was evolved.

The temperature rose to a maximum of about 135° F. after 35 minutes and then dropped to 117° F. at about 1½ hours from the start. 10 grams of $AlCl_3$ were added but no further reaction was apparent. The reaction was stopped by adding water to the mixture. The hydrocarbon phase was diluted with pentane and filtered to remove the $Al(OH)_3$. The pentane was allowed to evaporate as the sample was warmed slightly.

The properties of the resulting polymer are shown as Run #1 in Table 1. Note that all the tests indicate that an increase in molecular weight has occurred.

TABLE 1

|  | Light Polymer #1 | Run #1 | Run #2 |
|---|---|---|---|
| Gravity, ° API | 58.6 |  | 40.3 |
| Distillation, ° F.: |  |  |  |
| Initial Boiling Point | 142 | 140 | 260 |
| 10% Recovery | 208 | 370 | 380 |
| 50% Recovery | 274 | 565 | 582 |
| 90% Recovery | 480 | 620 | 628 |
| Final Boiling Point | 500 | Cracked | Cracked |
| Bromine Number, g. Br/100 g | 129 | 55.7 | 56.8 |
| Viscosity, SSU at 210° F |  |  | 35.0 |
| Mol Wt | 215 | 343 | 310 |

Example II 500 ml. of the light polymer identified in Table 1 were added to 10 grams $AlCl_3$. The initial temperature was 32° F. The catalyst became coated with a plastic mass. Additional catalyst was heated with a small amount of the light polymer and the resulting red complex mixture was added to the cold mixture noted above. The activated catalyst complex settled to the bottom with the original catalyst mass.

The temperature of the mixture was allowed to increase. The red color intensifies at 75° F. but the catalyst is still a plastic mass. At 85° F. the catalyst mass began to break up into a granular form. The temperature was maintained at 80 to 90° F. The catalyst continued to become redder and more granular.

After about 40 minutes of reaction, the mixture was cooled to 70° F. and the catalyst returned to the plastic like mass. After one hour and twenty minutes 10 grams of AlCl₃ were added and the temperature was allowed to slowly rise. After two hours and eight minutes 10 grams AlCl₃ were added. After two hours and thirty minutes the catalyst was decomposed using water. The resulting polymer had the properties described in Run #2, Table 1.

TABLE 2
[Heavier light polymer]

|  | Light Polymer Charge | Run #3 |
|---|---|---|
| Gravity, ° API | 44.7 | 42.0 |
| Distillation, ° F.: |  |  |
| Initial Boiling Point | 272 | 320 |
| 10% Recovery | 340 | 402 |
| 50% Recovery | 448 | 536 |
| 90% Recovery | 584 | 652 |
| Full Boiling Point | 606 | Cracked |
| Bromine Number, g. Br/100 g |  |  |
| Viscosity, SSU at 210° F |  | 32.0 |
| Mol Wt |  |  |

*Example III*

200 ml. light polymer charge (Table 2) was heated with two grams AlCl₃ to 115° F. The mixture had a red color but was still plastic-like around the catalyst. After one hour 10 grams AlCl₃ were added and the temperature increased to 132° F. The catalyst dispersed as the complex formed. The clear solution over the catalyst was decanted and washed. The product was water white and had the properties as noted in Run #3, Table 2.

TABLE 3

|  | Light Polymer | Run #4 | Run #5 |
|---|---|---|---|
| Gravity, API | 44.8 | 42.0 | 44.0 |
| Distillation, ° F.: |  |  |  |
| I.B.P | 288 | 338 | 360 |
| 10% Recovery | 350 | 398 | 404 |
| 20% Recovery | 380 | 434 | 426 |
| 30% Recovery | 410 | 462 | 448 |
| 50% Recovery | 452 | 520 | 494 |
| 70% Recovery | 508 | 562 | 536 |
| 90% Recovery | 590 | 644 | 602 |
| F.B.P | 624 | Cracked | Cracked |
| Bromine No., g. Br/100 g | 77.9 | 63.8 | 66.7 |
| Viscosity, CS at 210° F | 1.10 | 1.72 | 1.48 |
| Mol Wt | 245 | 275 | 257 |

*Example IV*

158.5 grams of light polymer in Table 3 was placed in pressure bottle and 10 grams of AlCl₃ added. Container plus sample was placed in a 130° F. bath with constant stirring for one hour. A red complex formed immediately after polymer charge was warmed by the bath and continued to form until the whole sample was very red. The red complex settled to the bottom in a plastic-like mass. At the end of one hour the sample cooled for thirty minutes at 48° F. and 200 grams of H₂O were added. The addition of H₂O caused a temperature change of 80° F. to 104° F. and also changed the color from red to yellow.

The final hydrocarbon phase after filtration and addition of CaCl₂ to dry was clear, but yellow in color. The light polymer recovery was 93.7% of charge and is identified as Run #4 in Table 3.

*Example V*

200 grams of light polymer as shown in Table 3 were placed in an open beaker. With constant stirring 4.2 g. BF₃ was bubbled through polymer with a fritted glass tube. No attempt was made to control the temperature.

As the BF₃ entered the light polymer, a red complex formed and continued to form until BF₃ addition stopped.

The times and temperatures of the reaction were as follows:

| | ° F. |
|---|---|
| Initial | 80 |
| 6 Minutes | 84 |
| 10 Minutes | 86 |
| 14 Minutes | 90 |
| 18 Minutes | 93.5 |
| 22 Minutes | 102.5 |
| 26 Minutes | 109.0 |
| 30 Minutes | 117.0 |
| 34 Minutes | 119.0 |
| 39 Minutes | 119.0 |
| 42 Minutes | 118.0 |
| 48 Minutes | 114.0 |
| 54 Minutes | 111.0 |
| 60 Minutes | 109.0 |

After 18 minutes the sample became hazy and at 42 minutes of reaction time the BF₃ addition was stopped.

The light polymer was washed with 200 grams H₂O and filtered by suction through #42 paper. The final hydrocarbon phase had a pale yellow color and hazy appearance. CaCl₂ was added to a dry sample but red complex formed again. The sample cooled overnight and the pale yellow color reappeared. The light polymer recovery was 88.0% of charge and the product was listed as Run #5 in Table 3.

TABLE 4

|  | Charge | Run #6 | Run #7 | Run #8 |
|---|---|---|---|---|
| Gravity, ° API | 64.8 | 43.5 | 45.4 | 44.8 |
| Distillation, ° F.: |  |  |  |  |
| I.B.P | 200 | 236 | 380 | 242 |
| 10% Recovery | 210 | 346 | 414 | 344 |
| 20% Recovery | 210 | 394 | 434 | 400 |
| 30% Recovery | 210 | 426 | 448 | 430 |
| 50% Recovery | 210 | 480 | 478 | 478 |
| 70% Recovery | 210 | 540 | 514 | 524 |
| 90% Recovery | 212 | 658 | 578 | 628 |
| F.B.P | 224 | 658 | 614 | 644 |
| Bromine No., g. Br/100 g | 142.6 | 77.9 | 77.6 | 78.8 |
| Viscosity, CS at 100° F | 3.87 | 4.40 | 3.91 | 3.91 |
| Mol Wt | 112 | 273 | 249 | 270 |

*Example VI*

125 grams of diisobutylene of Table 4 is mixed with constant stirring with 5 grams of AlCl₃ at 80° F. in an open beaker reactor. A red complex immediately formed and the temperature reached 180° F. at 15 minutes. After 15 minutes of reaction, the temperature began to decrease and at 30 minutes five additional grams of AlCl₃ were added. The temperature continued to decrease and after one hour of reaction 200 grams of H₂O were added. The final hydrocarbon phase, after filtration, was hazy with a yellow color as further identified in Table 4. The average molecular weight exceeds that of isobutylene tetramer. The recovery was 86.4% of charge, and is listed as Run #6 in Table 4.

*Example VII*

BF₃ is added through a fritted glass scrubber to 175 grams of diisobutylene of Table 4 and was stirred constantly at 80° F. in an open beaker. The moment the BF₃ contacted the hydrocarbon the temperature increased to 200° F. At 200° F. the BF₃ addition was stopped and the temperature decreased to 180° F. At 180° F. the BF₃ addition was continued again and a deep yellow color appeared. A total of 10 grams of BF₃ were added to the diisobutylene. After one hour of reaction 200 grams of H₂O were added. The final hydrocarbon, after filtration and drying with silica gel, was pale yellow and clear. The recovery of charged hydrocarbon was 92.0% and is listed as Run #7 in Table 4.

*Example VIII*

174 grams of diisobutylene of Table 4 are mixed constantly with small amounts of AlCl₃ in an open beaker at 80° F. The temperature increased after 8 minutes of reaction to 137° F. and at this point the $AlCl_3$ formed a yellow plastic-like mass. After 13 minutes of reaction the temperature had reached 202° F. and a red complex began to form. At 15 minutes the temperature began to decrease and the remaining $AlCl_3$ was added, all at once. The total $AlCl_3$ added to the diisobutylene was 10 grams. The temperature continued to drop but the fresh $AlCl_3$ added formed more red complex material. At one hour 200 grams of $H_2O$ were added and the final hydrocarbon, after filtration and drying with silica gel, was clear with a yellow color as further described in Table 4. The hydrocarbon recovery of charge was 89.7%, and is further identified as Run #8 in Table 4.

As indicated above, a corresponding increase in viscosity does not take place when heavy polyisobutylene polymer is similarly treated with Friedel-Crafts catalyst. Indeed, either little or no change in the body of such heavy polymer takes place or in some cases the viscosity is actually reduced. The following examples and table show the effect on the total polymer as well as upon select distillation fractions.

Again, while this invention is not to be limited by any theory, since any lighter fraction contains some very light components whose viscosity may be increased with catalytic polymerization and a heavier fraction has components whose viscosity may be reduced in this treatment, the data seems to support this.

The times and temperatures of the reaction were as follows:

Example IX 200 grams of heavy polyisobutylene, as identified in the first column of Table 5 below, are mixed in an open beaker reactor with $BF_3$ using a fritted glass bubbler and a stirring bar. The initial temperature of the polyisobutylene was 82.5° F. and was increased to 123° F. after 30 minutes. A red complex formed after 3 minutes of reaction and at one hour $BF_3$ addition increased. The temperature again reached 123° F. During one hour and fifteen minutes of reaction a total of 36 grams of $BF_3$ was bubbled through the polyisobutylene.

The final polyisobutylene sample was washed with 200 grams of $H_2O$ and dissolved in n-pentane. The n-pentane-polyisobutylene solution was dried with silica gel and filtered. The final polyisobutylene, after evaporation of n-pentane, was clear with dark brown color. The recovery was 81.5% of the charged polyisobutylene.

TABLE 5

|  | Heavy Polyiso-butylene | Run #9 | Run #10 | Run #11 |
|---|---|---|---|---|
| Bromine Number, g. Br/100 g | 25.4 | 25.5 | 27.4 | 23.5 |
| Viscosity, SSU at 210° F | 288.6 | 206.8 | 216.6 | 239.3 |
| Molecular Weight | 617 | 566 | 595 | 623 |

Example X 200 grams of heavy polyisobutylene as identified in Table 5 and 10 grams $AlCl_3$ mixed with constant stirring in an open beaker at an initial temperature of 80° F. After fifty minutes of reaction the temperature had reached 123° F. At this point 10 ml. of $H_2O$ were added which caused the temperature to increase and also more red complex to form. After fifty-seven minutes of reaction time the red complex disappeared and the temperature of 160° F. began to fall. At one hour 10 additional grams of $AlCl_3$ were added and the temperature and red complex increased. The temperature reached 164° F. and began to decrease. At eighty minutes of reaction time 10 grams $AlCl_3$ were added and a small temperature rise occurred, 140° F. to 152° F.

The reaction stopped after one hour and thirty minutes with 200 grams of $H_2O$. The polyisobutylene was dissolved in n-pentane, dried with silica gel and filtered. The final polyisobutylene, after evaporation of n-pentane, was clear with a deep yellow color and identified as Run #10 in Table 5. The recovery of charged polyisobutylene was 85.0%.

Example XI 200 grams of heavy polyisobutylene, as identified in Table 5, was mixed with constant stirring with 57 grams $BF_3$ added through a fritted glass tube. The initial temperature was 78° F.

Two 5 ml. portions of $H_2O$ were added to the reaction; one at five minutes which increased the temperature from 82° F. to 110.5° F. at 30 minutes and 5 additional ml. of $H_2O$ at 30 minutes of reaction which increased the temperature from 110.5° F. to 124° F. at 70 minutes. The temperature at this point began to decrease and fell to 120° F. at 85 minutes of reaction time.

The reaction was stopped with 200 grams of $H_2O$. The heavy polyisobutylene treated product was dissolved in n-pentane, dried with silica gel, filtered, and the n-pentane evaporated. The final 90.0% of charged heavy polyisobutylene was clear with yellow color and is identified as Run #11 in Table 5.

Example XII

A glass tube was filled with granules of platinum chloride supported on kieselguhr. The tube was wrapped externally with electrical heating wire and heated to a temperature of 650° F. Hydrogen gas was passed through the tube for a period of 2 hours at a rate of 0.05 cu. ft. per second. Thereafter the temperature was reduced to 400° F. and the hydrogen flow reduced to 0.03 ft. per second. The polymerization product obtained in Example IX was introduced into the top of the tube and flowed countercurrent to the hydrogen at a rate to provide a residence time of approximately 2 minutes, about 2 grams per minute. The bromine number was found to have been reduced to about 7.0 and the original pungent odor was now bland, substantially odorless, and the color was water-white. It did not tend to become discolored standing in a closed bottle over a period of three months.

Light polymer samples, before and after treatment with $AlCl_3$, were distilled by normal ASTM standard distillation, the data being set forth in Table 6.

TABLE 6

|  | Light Polymer | Light Polymer After $AlCl_3$ |
|---|---|---|
| Distillation, ° F.: |  |  |
| I.B.P | 288 | 360 |
| 25% Recovery | 394 | 446 |
| 50% Recovery | 448 | 499 |
| 75% Recovery | 522 | 558 |
| F.B.P (Btms.) | 624 | 640 |

Light polymer samples shown in Table 7 before and after treatment with $AlCl_3$ were subjected to an ASTM distillation. Table 8 shows each light polymer sample cut into equal fractions. The final data, Table 9, presents the molecular weights, bromine numbers and viscosities determined on each fraction.

TABLE 7

|  | Light Polymer | Light Polymer After $AlCl_3$ |
|---|---|---|
| Distillation ASTM, ° F.: |  |  |
| IBP | 100 | 308 |
| 10% Recovery | 214 | 376 |
| 20% Recovery | 234 | 420 |
| 30% Recovery | 243 | 456 |
| 50% Recovery | 294 | 530 |
| 70% Recovery | 386 | 596 |
| 90% Recovery | 530 | 638 |
| FBP | 530 | 644 |
| Gravity, ° API | 57.4 | 41.8 |
| Bromine No., g. Br/100 g | 132.4 | 75.5 |
| Molecular Wt | 121 | 282 |

The molecular weight for the light polymer sample (121) was calculated from the bromine number.

TABLE 8

|  | Light Polymer | Light Polymer After AlCl₃ |
|---|---|---|
| Distillation ASTM, °F.: | | |
| IBP | 100 | 308 |
| 25% Recovery | 244 | 430 |
| 50% Recovery | 296 | 522 |
| 75% Recovery | 400 | 608 |
| FBP (Btms.) | 530 | |
| Gravity, °API | 27.3 | 41.8 |

TABLE 9

|  | Light Polymer | | | Light Polymer After AlCl₃ | | |
|---|---|---|---|---|---|---|
|  | Br No. | M.W. | Visc. | Br No. | M.W. | Visc. |
| 1st Fraction (IBP–25%) | 156.4 | <u>102</u> | 0.5 | 91.4 | <u>175</u> | 1.6 |
| 2nd Fraction (25%–50%) | 151.5 | <u>106</u> | 0.7 | 86.7 | <u>229</u> | 3.2 |
| 3rd Fraction (50%–75%) | 113.5 | <u>141</u> | 1.1 | 75.2 | 279 | 9.0 |
| 4th Fraction (Btms.) | 83.5 | 225 | 3.1 | 55.8 | 388 | 129.2 |

Br No.—Bromine number grams Br/100 grams.
M.W.—Molecular weight.
Vis.—Viscosity at 100° F. in centistokes.
Molecular weights in Table 9 that are underlined have been calculated from the bromine numbers.

Various modifications will occur to those skilled in the art. The product can be applied to various uses for which viscous liquid polybutene polymers have been used. They are generally light in color, sometimes with a pungent odor, but may be purified to any degree desired and used as viscous oils for lubricants, hydraulic oils, sealants and the like. Accordingly it is intended that the description hereinabove be regarded as exemplary and not limiting except as claimed in the claims appended hereto.

I claim:

1. The method of forming $C_2$–$C_5$ olefine polymer liquids comprising polymerizing a liquefied refinery gas mixture of $C_2$–$C_5$ olefine monomers containing at least 3% of isobutylene with aluminum chloride to form a liquid polymeric mixture containing both high molecular weight and low molecular weight isobutylene polymer components, separating from said mixture a volatile polymeric isobutylene liquid having an average molecular weight between about 110 and 300, and treating said volatile olefine polymer liquid with about 1 to 10% of a Friedel-Crafts catalyst to body the same.

2. The method as defined in claim 1 wherein said Friedel-Crafts catalyst is aluminum chloride.

3. The method as defined in claim 1 wherein said Friedel-Crafts catalyst is boron fluoride.

4. The method as defined in claim 1 wherein the bodied polyolefine liquid is reblended with the initially separated heavier olefine polymer liquid.

5. The method as defined in claim 1 wherein the bodied polyisobutylene liquid is purified by hydrogenation.

References Cited

UNITED STATES PATENTS

| | | | |
|---|---|---|---|
| 2,777,890 | 1/1957 | Ikeda | 260—638.15 X |
| 2,806,072 | 9/1957 | Cohen et al. | 260—683.15 |
| 3,053,915 | 9/1962 | King | 260—683.9 |
| 3,100,808 | 8/1963 | Dyer | 260—683.9 |
| 3,119,884 | 1/1964 | Allen et al. | 260—683.15 |
| 3,149,178 | 9/1964 | Hamilton et al. | 260—683.9 |
| 3,179,710 | 4/1965 | Ratajczak et al. | 260—683.15 |
| 3,287,332 | 11/1966 | Saeki et al. | 260—683.15 |

PAUL M. COUGHLAN, JR., *Primary Examiner.*